C. A. MEILICKE.
CALCULATING MACHINE.
APPLICATION FILED MAR. 4, 1908.
914,439.
Patented Mar. 9, 1909.
3 SHEETS—SHEET 1.
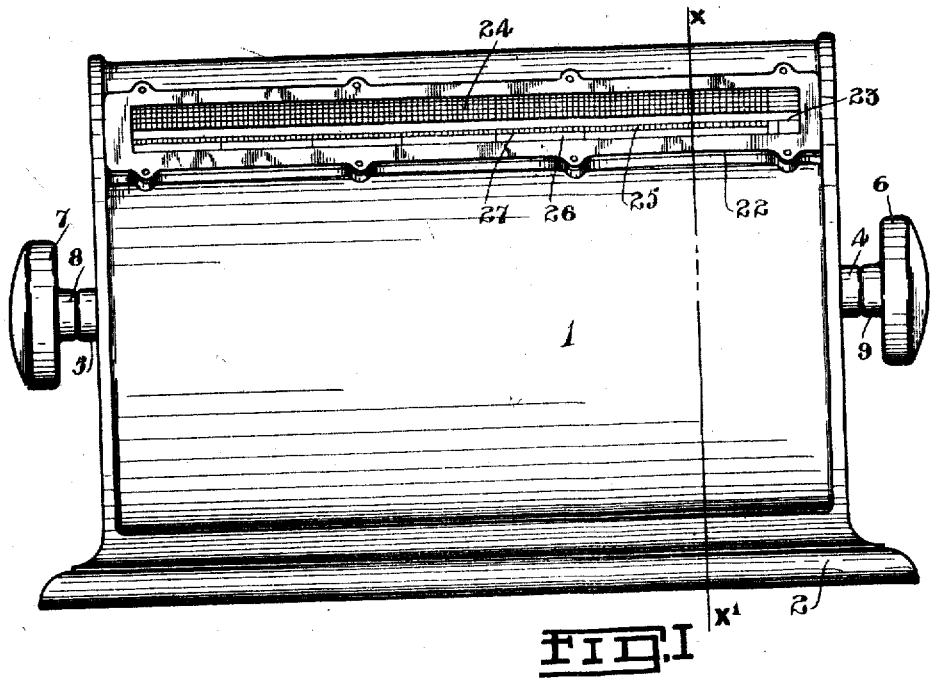
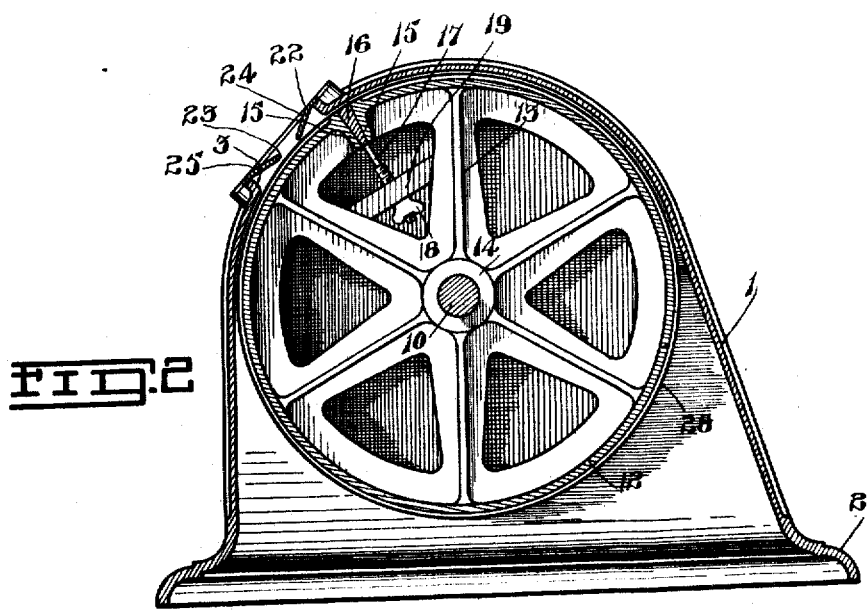
WITNESSES
INVENTOR C. A. MEILICKE.
CALCULATING MACHINE.
APPLICATION FILED MAR. 4, 1908.
914,439.
Patented Mar. 9, 1909.
3 SHEETS—SHEET 2.
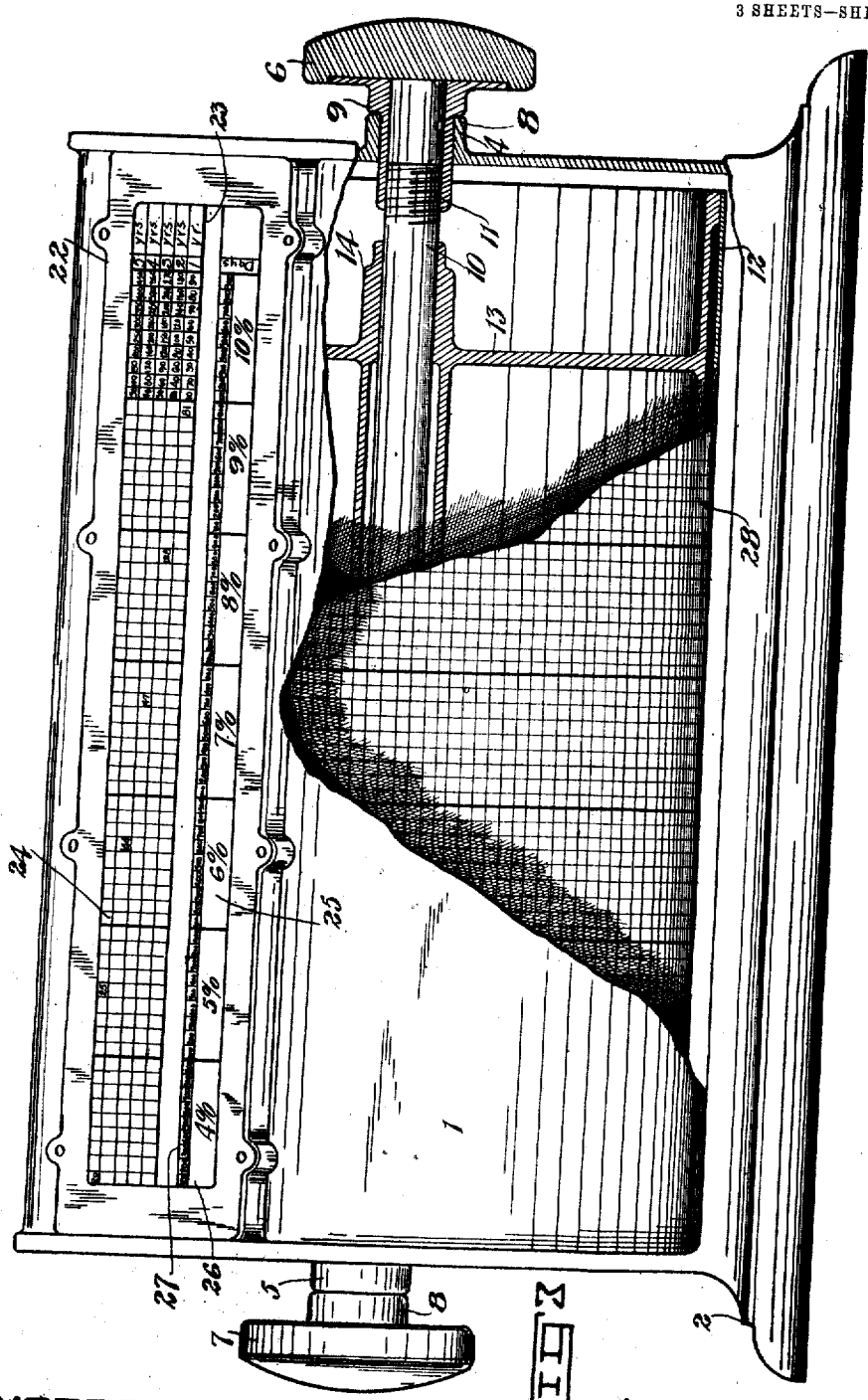
WITNESSES
INVENTOR

C. A. MEILICKE.
CALCULATING MACHINE.
APPLICATION FILED MAR. 4, 1908.

914,439.

Patented Mar. 9, 1909.
3 SHEETS—SHEET 3.

Fig. 4.

Fig. 5.

WITNESSES.
Gerald S. Roxburgh
Jas. M. Tapley

INVENTOR
C. A. Meilicke
By Fred B. Fetherstonhaugh, His Atty.

12:12 # UNITED STATES PATENT OFFICE.

CARL ARNO MEILICKE, OF HANLEY, SASKATCHEWAN, CANADA.

CALCULATING-MACHINE.

No. 914,439.

Specification of Letters Patent.

Patented March 9, 1909.

Application filed March 4, 1908. Serial No. 419,215.

*To all whom it may concern:*

Be it known that I, CARL ARNO MEILICKE, of the town of Hanley, in the Province of Saskatchewan, Canada, lumber merchant, have invented certain new and useful Improvements in Calculating - Machines, of which the following is the specification.

My invention relates to calculating machines, and the object of the invention is to produce a simple mechanism which will enable charges or accounts of different kinds to be easily computed, and which is particularly designed for computing interest upon notes.

It consists essentially in a rotatable cylindrical drum on which is a daily computed interest chart, and a registering plate carried on a casing inclosing the drum, the plate having tabulated yearly interests on definite amounts, the construction and combination of parts being more fully described hereinafter and definitely set forth in the claims.

Figure 1 is a side elevation of my calculating machine. Fig. 2 is a vertical sectional view in the plane denoted by the line X X¹, Fig. 1. Fig. 3 is an enlarged front elevation of the machine, part being shown in vertical longitudinal section and part being broken away as will appear. Fig. 4 represents a portion of the tabulated plate carried by the inclosing casing of the drum, and also a portion of the interest chart on the drum. Fig. 5 is a detailed perspective of a portion of the drum showing the manner in which the chart is secured thereon.

In the drawings like characters of reference indicate corresponding parts in each figure.

1 represents an inclosing casing, the upper portion being substantially cylindrical in form and disposed with its axis horizontal, said casing being formed below into a suitable base 2, adapted to rest upon a horizontal support such as a table or desk. At a suitable point, preferably upon the upper side, the wall of the casing is provided with an elongated slot 3, which passes across the casing as shown. The purpose of this opening will appear more fully hereinafter. The end pieces of the casing are formed with suitable bearings 4 and 5, and the center of the cylindrical portion of the casing is concentric with the bearings.

6 and 7 are thumb heads, each formed integral with a sleeve 8, which is received in the bearings 4 and 5, respectively, and passes slightly within the casing. The sleeves have both a shoulder 9 which rests against the respective bearings.

10 is a longitudinal shaft or axle having its ends threaded as at 11, and being thus adapted to screw into the threaded center of the sleeves 8.

12 is a drum of cylindrical form, rigidly fastened to the shaft by means of radial ribs or spokes 13 passing to a hub 14 which is in turn connected to the shaft, so that turning the thumb heads enables the drum to be rotated as desired. The drum is slit longitudinally from end to end and the sides of the slit are formed with suitable ribs 15 which form a bearing face for a wedge-shaped strip 16 which is placed there between. Fastened to the wedge along its length are rods 17 which extend radially inwardly, and are provided with a threaded end on which operates a winged or other such nut 18.

19 is a cross brace passing between the ribs 13 and through which the respective rods 17 pass. The nuts on these rods are on the inner side of the braces, and consequently screwing up the nut tightens the wedge-shaped strip 16 in the drum.

Upon the outer surface or periphery of the drum I attach a chart or sheet of metal on which figures are arranged so that they constitute a computing table. The sheet is divided into circumferential and longitudinal rows as shown. As to the precise arrangement of the figures I will describe this shortly. The sheet could be formed of paper printed as required and simply pasted or stuck on the drum, but in the present instance where a metallic sheet is used, the ends of the sheet are bent inwardly as at 20 and 21 and inserted against the opposing faces of the ribs 15. By turning the winged nuts 18 the wedge-shaped plate 16 is drawn inwardly and binds and holds the sheet tightly against the ribs and in position on the drum.

22 is a plate which has an elongated slot 23 used as a sight opening, through which may be seen the chart on the drum. The plate is suitably bolted to the casing covering over the slot or opening 3 as is best shown in Fig. 2. Above the slot 23 is a computed interest table 24, and below is a second table 25, which has an upper and a lower longitudinal row 26 and 27, respectively. The rows are both divided into seven major columns, and on the lower row 4, 5, 6, 7, 8, 9, and 10% interests are notated successively in the columns. Each major column in the upper row is subdivided into nine minor columns in which the numbers 100, 200, 300, ... to 900, are successively placed. At the end of the seventh major column, that is to the right, is written the word "Days".

Although I have spoken of the interests 4%, 5%, 6%, etc., and of the seven major columns, it will be understood these could be increased or decreased according to the requirement in any particular case.

The upper table 24 is as now described. It is divided into five longitudinal rows, and seven major columns, corresponding to the major columns of the lower table. The major columns are again sub-divided into nine minor columns. Directly to the right of the table 24, and above the word "Days" is written successively, in rows "1 Yr.", "2 Yrs.", "3 Yrs.", "4 Yrs.", and "5 Yrs." In the minor columns in each instance directly above the percentages shown on the lower table are tabulated the amount of interest on a sum of 100, 200, 300, ... to 900, dollars, for 1, 2, ... to 5, years. The number of rows on this latter table could also be increased to accommodate any number of years required, and although I have only shown the yearly interests for five years, that for further years could easily be computed and tabulated.

The chart 28 on the drum is as already suggested divided into longitudinal rows and circumferential columns; the number of longitudinal rows being three hundred and sixty-four, and the number of each appears on the drum through the sight opening directly in a line with the word "Days" on the lower table 25. The number of circumferential columns is exactly the same as the number of minor columns on the tabulated plate 22, and in the successive spaces longitudinally across the chart are tabulated interests on a definite amount at a definite rate of interest for a definite number of days.

In order that the manner of making calculation may be the better understood I will now give an example, the figures for which will be better found if reference be made to Fig. 4 where a portion of both the chart and tabulated scale are shown.

In banks and similar institutions notes are constantly being computed and I will suppose that the interest is to be computed on a note which is due or matures on December the 30th; the present date being considered as January the 3rd. The number of days to maturity is readily figured and found to be three hundred and sixty-one. The calculating machine is then used and the drum is turned till "361" appears, through the sight opening, opposite the word "Days" on the tabulated plate. Suppose next the interest is stated at 5%, and that the amount of the note is $200.00. Referring now again to the calculator, on the lower table of the tabulated plate we find "5%", and a number "200", which we use. Directly above "200" we see through the sight opening and on the drum a number "9.89", which is the interest on $200.00, for three hundred and sixty-one days at five per cent. Consequently the amount necessary to meet the note when it is matured would be two hundred and nine dollars and eighty-nine cents.

A second example is now given to show how the calculator can be utilized for irregular amounts which may fall due within a certain number of years and days. For example if it be asked what amount is necessary to meet a note for four hundred and twenty-three dollars, which matures in two years and three hundred and sixty one days, the interest being given at four per cent. To find this the drum is turned till "361" appears in the sight opening opposite the word "Days", and on the lower table of the tabulated plate we find "4%", and also the numbers "400, 200, and 300", and directly opposite these on the drum the amounts "15.83, 7.91, and 11.87", which are the computed interests on 400, 200, and 300, at 4%, for 361 days. The amount $423.00 is made up of $400.00, $20.00, and $3.00, and the interest on $400.00 is as above $15.83, on $200.00 $07.91, which is the same as $00.79 on $20.00, and on $300.00 the interest is $11.87, which is the same as $00.11 on $3.00. Consequently the interest on the $423.00 for 361 days would be the summation of the interest amounts found which equals $15.83, $0.79 and $0.11 added together, or in all $16.73. In the upper table on the plate we have in the row opposite "2 Yrs.", and directly above the amounts "400, 200, and 300" on the "4%" column, the amounts "32, 16, and 24", which are the computed interests on "400, 200 and 300", at 4%, for 2 years. By changing the decimal point in the same manner as we have previously done we find that the interest on $400.00, is $32.00, on $20.00 is $1.60, and on $3.00 is $0.24, which summated is $33.84. Combining this with the interest already obtained, i. e. $16.73, we have the interest on the note for the time stated, that is $50.57. The amount then required to meet the note when it matures would be the original amount added to the interest, or $473.51.

The calculating machine as shown will be found ample to satisfy ordinary conditions. In banks and such like institutions where the range does not need to be so large as described in the present instance I would construct a machine which would have only the prevailing percentages on it, with the corresponding tabulated interests.

Although I have explained the working of the calculator as applied to computing interest on the dollars and cents basis, it might be applied to any decimal system of currency.

What I claim as my invention is:

1. In a machine for computing interest on notes, in combination a casing having a sight opening therein; a drum rotatably mounted within said casing and having thumb heads extending therefrom beyond the casing whereby it may be rotated; a computed interest chart having a day index, on the drum; a plate having an elongated opening therein secured to the casing, the opening registering with the sight opening in the casing, the said plate having a lower table with a series of percentages and a number of definite amounts noted thereon, and an upper table with computed interests on such amounts at the individual percentages and a year index to such interests, as and for the purpose specified.

2. In a machine for computing interest on notes, a rotatably mounted drum having thereon a chart containing interest amounts arranged successively in numbered divisions corresponding to the days for which the notes may run; and a plate registering with the chart and having an elongated slot forming a sight opening therein, there being beneath the slot a table having a number of percentages successively arranged thereon with amounts similarly notated successively above each of the percentages, and above the slot a table having the interest amounts, corresponding to the definite amounts at the successive rates of interest on the lower table, notated, such interest amounts being arranged successively in numbered divisions corresponding to the years for which the notes may run, as and for the purpose specified.

3. In a machine of the class described the combination comprising a drum having a longitudinal slit therein; a chart adapted to be placed on the drum and with its ends inserted within the slit; a wedge-shaped strip adapted to pass within the slit, and means for tightening the wedge, as and for the purpose specified.

4. In a machine of the class described the combination comprising a drum having a longitudinal slit therein, there being inwardly extending ribs formed at the sides of the slits; a chart arranged to pass around the drum and having its ends passing within the slit; a wedge-shaped strip adapted to enter the slit to hold the chart on the drum; and adjustable means for tightening the wedge between the ribs, as and for the purpose specified.

CARL ARNO MEILICKE.

Witnesses:
R. COBAIN,
B. BOYD.